United States Patent [19]

Gonzalez

[11] Patent Number: 5,617,667
[45] Date of Patent: Apr. 8, 1997

[54] ADAPTABLE DEVICE FOR TROLLING JIGS

[76] Inventor: Arturo L. Gonzalez, Belisario Dominguez #123, Mexico City D.F. 04000, Mexico

[21] Appl. No.: 519,022

[22] Filed: Aug. 24, 1995

[30] Foreign Application Priority Data

Oct. 17, 1994 [MX] Mexico .................................... 947999

[51] Int. Cl.⁶ .................................................. A01K 85/18
[52] U.S. Cl. ................................. 43/42.36; 43/42.39
[58] Field of Search .......................... 43/42.36, 42.37, 43/42.39

[56] References Cited

U.S. PATENT DOCUMENTS

| | | | |
|---|---|---|---|
| 3,108,390 | 10/1963 | Knight | 43/42.36 |
| 4,520,588 | 6/1985 | Hindermyer | 43/42.36 X |
| 5,113,607 | 5/1992 | Pate | 43/42.36 X |
| 5,167,089 | 12/1992 | Schriefer | 43/42.36 |
| 5,339,560 | 8/1994 | LeMaster | 43/42.44 |
| 5,347,744 | 9/1994 | Getschel | 43/42.36 |
| 5,349,776 | 9/1994 | Lucas | 43/42.39 |
| 5,351,433 | 10/1994 | Ellis | 43/42.22 |
| 5,351,434 | 10/1994 | Krenn | 43/44.91 |
| 5,353,540 | 10/1994 | Ward | 43/42.24 |

*Primary Examiner*—Joseph J. Hail, III
*Assistant Examiner*—Jay A. Stelacone
*Attorney, Agent, or Firm*—Roylance, Abrams, Berdo & Goodman, L.L.P.

[57] ABSTRACT

A trolling jig or fishing lure includes a body portion having a cylindrical first member extending axially from a head member. The first member includes a plurality of recesses for receiving prongs extending from a second member for coupling the second member to the first member in a number of different positions. A leader passes through a bore extending through the head member and first and second members, and terminates in a closed loop for connecting to a hook. A clip member is attached to the leader and is removably coupled in a recess of the second member to secure the body portion of the lure in a fixed angular position on the leader.

13 Claims, 4 Drawing Sheets

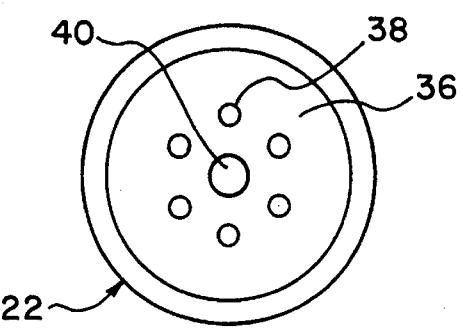
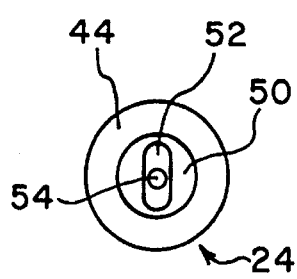
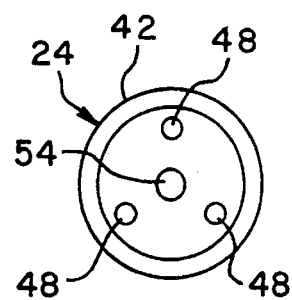
FIG. 3          FIG. 5          FIG. 6
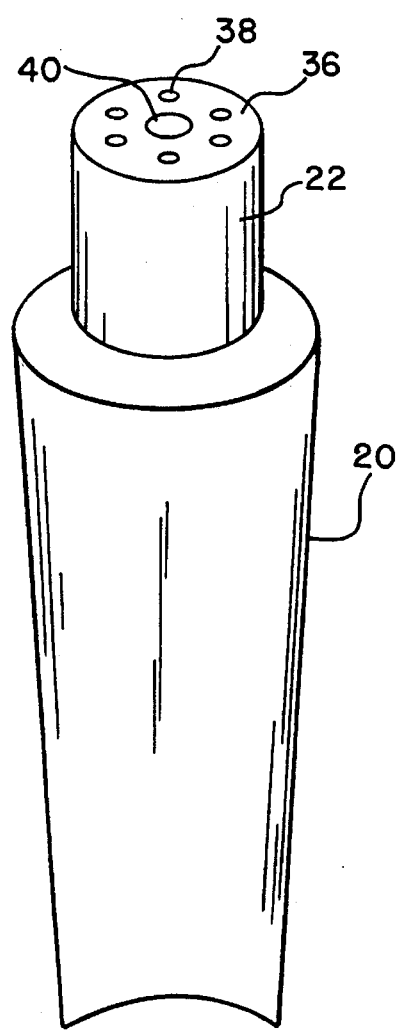
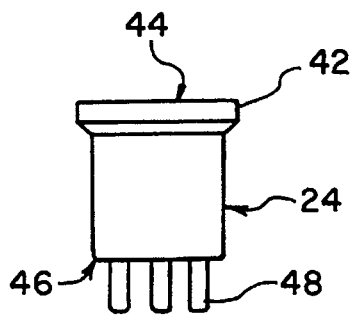
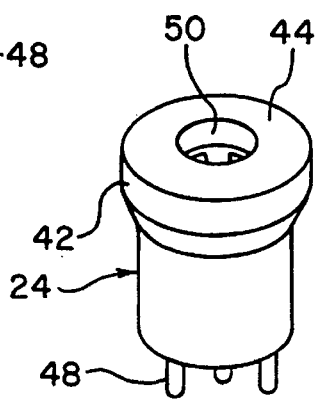
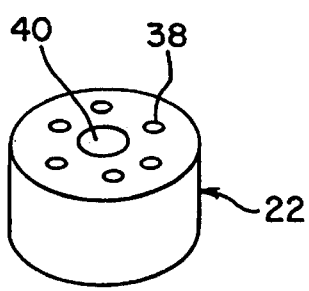
FIG. 7
FIG. 8
FIG. 10
FIG. 4

ADAPTABLE DEVICE FOR TROLLING JIGS

FIELD OF THE INVENTION

The present invention is directed to two-piece fishing lures. More particularly, the invention is directed to fishing lures having a separable body portion.

BACKGROUND OF THE INVENTION

There currently exist several types of trolling jigs, or lures, with designs which are used for the fishing of various marine species and which, in general terms, carry out their intended function. However, most of these present the problem that the movements of the lures result in the hook becoming tangled with the leader and fishing line. When tangled, the hook is such that the fish would not be hooked, since the hook is typically positioned opposite the normal position required for hooking the fish.

Accordingly, there is a continuing need in the art for fishing lures and jigs which resist tangling with the leader and the fishing line.

SUMMARY OF THE INVENTION

Therefore, one of the primary objectives of this invention is to provide a device which permits the hook to be held continuously in the proper position, so that the fish can bite and become hooked.

Another object of this invention is to provide a procedure for adapting the device of this invention to an existing trolling jig or lure.

Another object of this invention is to provide a device with a simple design which can be easily adapted to any trolling jig.

Another object of this invention is to provide a trolling jig, wherein once the fish has been hooked, the jig is released from the leader with a slight pull, sliding along the leader away from the hook, thereby separating itself from the fish without pulling the hook.

Another object of this invention is to provide a fishing lure which maintains and fixes the hook in different positions with respect to the body of the trolling jig to produce different patterns of movement in the water.

These objects of the invention are basically attained by a fishing lure comprising a leader; a head member having a longitudinal axis with a leading end and a trailing end, the head member having an axial bore extending therethrough for receiving a leader; a first member extending axially from the trailing end of the head member, the first member having a trailing axial face with a plurality of axially extending recesses therein, the first member including an axial bore for receiving the leader; a second member having a plurality of prongs in a first axial face and being received in the recesses of the first member for coupling the second member in a selected angular position to the first member, the second member having a second axial face with a recess therein and an axial bore for receiving the leader; at least one hook coupled to the leader at a trailing end of the second member, a first clip member coupled to the leader coupling the hook to the leader; and being removably received in the recess in the second member; a second clip member coupled to the leader for supporting the at least one hook; wherein the first and second clip members are positioned on the leader, and spaced from the hook to prevent the at least one hook from tangling with the leader forward of the head member.

The objects of the invention are further attained by providing a fishing lure comprising an elongated body having a longitudinal axis with a leading end and a trailing end, and having an axial bore extending through the body, the trailing end including a recess therein, a leader extending through the body and having a closed loop at the trailing end of the body, at least one hook coupled to the loop of the leader; and a clip member on the leader for forming the loop, and being removably received in the recess for removably coupling the leader to the body and preventing rotational movement of the hook with respect to the body, wherein the clip is positioned on the leader to prevent the hook from becoming tangled in the leader forward of the body.

These and other objects, advantages and salient features of the invention will become apparent from the detailed description of the invention which, in conjunction with the annexed drawings, disclose preferred embodiments of the invention.

BRIEF DESCRIPTION OF THE DRAWINGS

Referring now to the drawings which form a part of this original disclosure:

FIG. 3 is an end elevational view of the first piece of the trolling jig showing the holes for receiving the second piece;

FIG. 4 is a perspective view of the first piece of the trolling jig;

FIG. 5 is a top plan view of the second piece of the trolling jig;

FIG. 6 is a bottom plan view of the second piece of the trolling jig;

FIG. 7 is a side elevational view of the second piece of the trolling jig;

FIG. 8 is a perspective view of the second piece of the trolling jig;

FIG. 10 is a perspective view of the first piece of the trolling jig in a second embodiment.

DETAILED DESCRIPTION OF THE INVENTION

Figure 1:
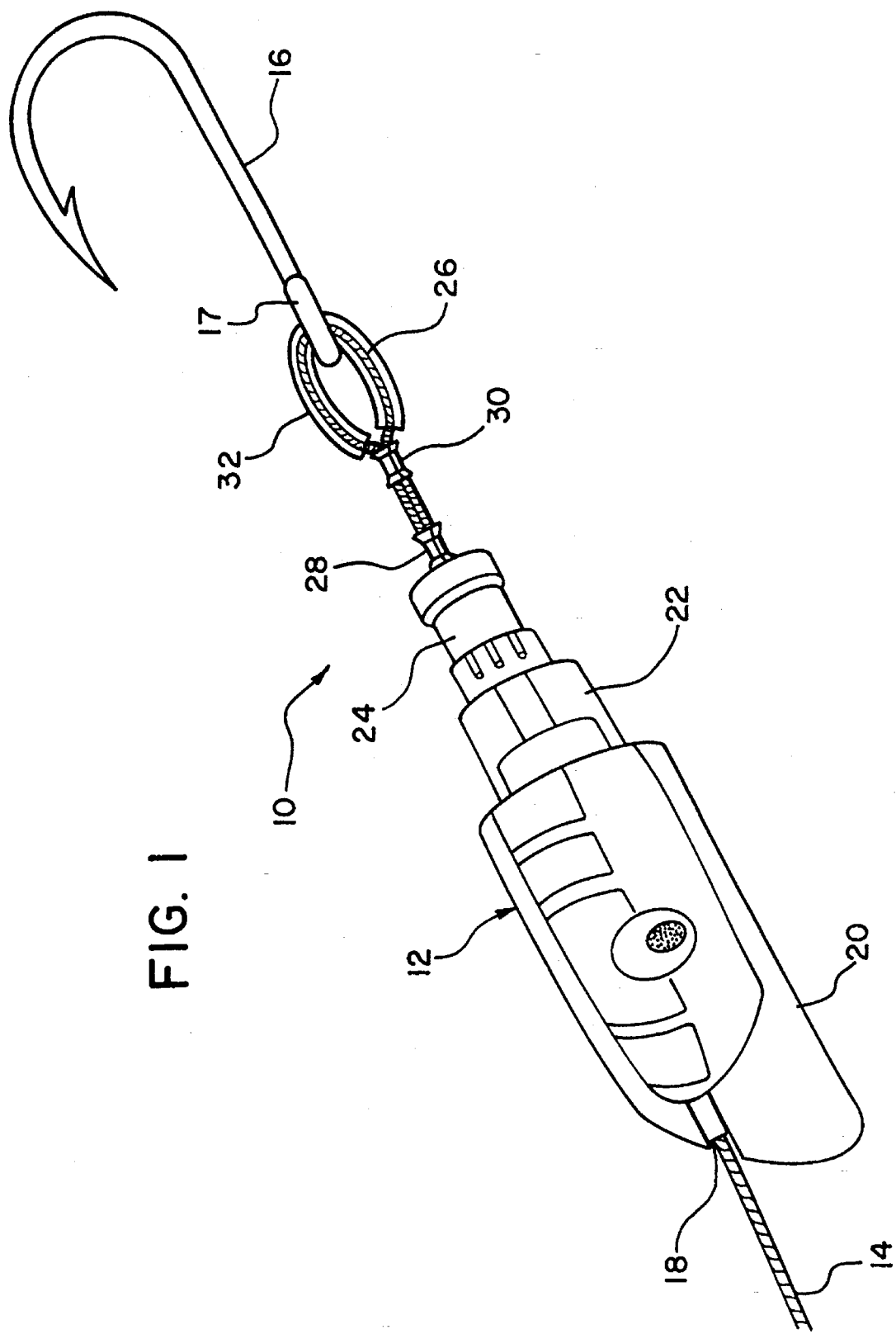
FIG. 1 is a perspective view of the trolling jig in a first embodiment of the invention.

Referring to the drawings, the trolling jig of the invention is in the form of a fishing lure 10 comprising a body portion 12, a leader 14 and a hook 16 coupled to the leader 14 by at least one clip member 28, 30.

Figure 2:
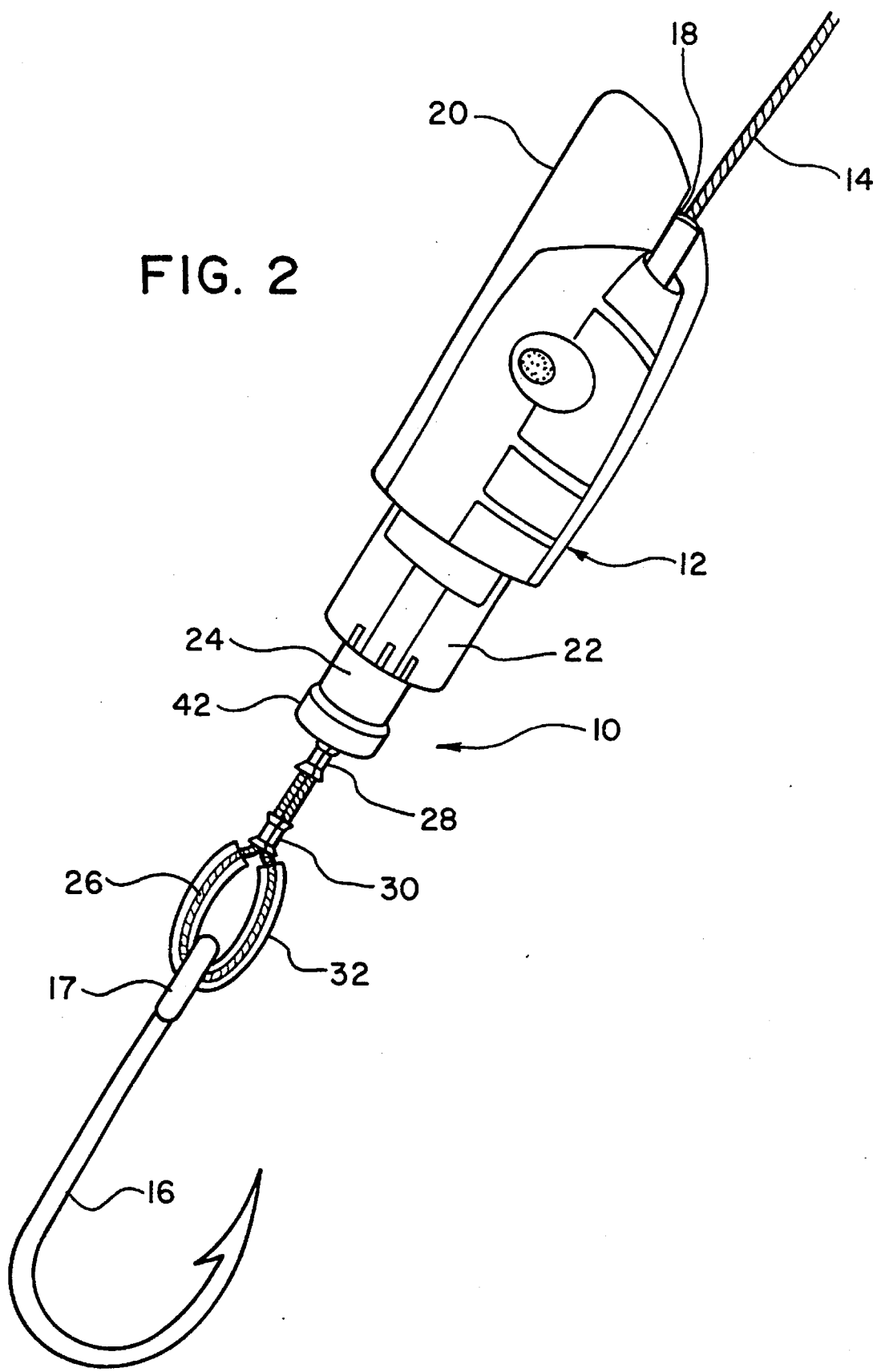
FIG. 2 is a side elevational view of the trolling jig in a first embodiment of the invention.

Body portion 12 has a generally elongated shape designed for moving through the water and producing various movements to attract the fish as known in the art. The body portion 12 has a longitudinal axis with a longitudinal bore 18 extending therethrough. The bore 18 as shown in FIGS. 1 and 2 is off-center from the center axis of the body portion 12 to produce a wriggling movement when pulled through the water. As shown in FIGS. 1 and 2, body 12 can have various designs thereon to resemble live bait. The body portion 12 can be made of any suitable material, although plastic materials are generally preferred.

Body portion 12 in the embodiment shown in FIGS. 1 and 2 includes a head member or head member or section 20 having a first substantially cylindrical-shaped member or piece 22 fixed to the trailing end thereof by an adhesive or other means. A second member or piece 24 is coupled to first member 22 as discussed hereinafter in greater detail. Head section 20 has a shape and dimension to produce the various wriggling movements when the lure is pulled through the water.

As shown in FIG. 1, leader 14 passes completely through the axial bore 18 of body 12 and terminates at a trailing end of the body by a closed loop 26. The loop 26 is essentially formed by folding over a portion of the leader 14 and coupling the overlapping portions together by at least one clip member 28. In preferred embodiments, a second clip 30 is spaced from the first clip member 28 to further secure the hook 16 on the leader 14. The clips 28, 30 in the embodiment shown are metal bands which are crimped to securely grasp the leader. The clips 28, 30 generally have a substantially oval or non-circular shape. A sleeve 32 is also provided on the loop 26 to protect leader 14 from hook 16. A standard barbed fishing hook 16 having an eyelet 17 is provided on the loop 26 as shown. Sleeve 32 is generally a flexible plastic tubing material which is able to bend to the contour of the loop 26, but is sufficiently stiff to resist knotting or tangling. The sleeve 32 retains the shape of the loop 26 and prevents the leader 14 from becoming tangled with the hook.

FIG. 2 shows a modification of the fishing lure of FIG. 1 where the first member 22 is integrally formed with the head member 20, but is otherwise similar to the embodiment of FIG. 1. First member 22 has a substantially cylindrical shape extending axially from the trailing end of head member 20. The axial trailing end face 36 of first member 22 includes a plurality of spaced apart recesses 38 extending axially into the first member 22. As shown in FIGS. 3 and 4, recesses 38 have a substantially circular shape and extend longitudinally into first member 22. The recesses 38 are preferably spaced circumferentially around axial bore 40. The axial bore 40 defines a portion of bore 18 to extend completely through body portion 12. In the embodiment shown, six recesses are equally spaced apart. FIG. 10 shows an alternative embodiment of the first member 22 having a cylindrical shape.

Second member 24 shown in FIGS. 5–8 also has a generally cylindrical shape having a collar 42 depending from the trailing end 44. As shown, second member 24 preferably has a diameter less than the diameter of first member 22. The leading end 46 of second member 24 includes a plurality of prongs 48 extending longitudinally therefrom. In the embodiment shown, three equally spaced-apart prongs 48 are provided. The prongs 48 complement recesses 38 so that prongs 48 are received in the recesses to couple the second member 24 to the first member 22. The prongs 48 are arranged to seat in any of the recesses 38 so that the angular position of the second member can be selectively adjusted with respect to the first member 22 and head member 20. The angular position of the second member 24 with respect to the first member 22 determines the movement of the body 12 as it passes through the water.

In preferred embodiments, prongs 48 frictionally engage recesses 38 to couple the first and second members together. In this manner, the first and second members are coupled together and can slide along leader 14 as a single unit defined by body 12. Second member 24 is removably coupled to first member 22 by the prongs 48 and recess 38 to selectively adjust the position of the first member 22 with respect to the second member 24. In further embodiments, second member 24 is permanently fixed to first member 22 by an adhesive or other suitable means.

The trailing end 44 of second member 24 includes a cylindrical recess 50 aligned with the axial bore 40. The bottom of recess 50 is defined by an oblong or oval shaped recess 52 as shown in FIG. 5. Recess 52 preferably has a shape complementing the shape of the first clip 28 so that when clip 28 is seated in recess 52, the clip 28 is prevented from rotating therein. The clip 28 being rotationally fixed in the recess 52 resists rotational movement of the hook 16 with respect to body 12 so that the hook remains in a relatively fixed position. A bore 54 extends axially through second member 24 to receive the leader 14.

In preferred embodiments of the invention, first clip 28 frictionally engages recess 52 to retain the body 12 in a fixed position with respect to leader 14 and to maintain hook 16 in a specific angular position with respect to the body 12. The angular position of second member 24 with respect to first member 22 by the orientation of prongs 48 and recess 38 selectively position the hook 16 with respect to body 12. Clip member 28 is positioned on the leader 14 and spaced from hook 16 a distance so that when clip member 28 is coupled to second member 24, hook 16 is not able to swing around and become tangled with leader 14 forward of head member 20. Head member 20, first member 22 and second member 24 also have a length complementing the length of leader 14 between first clip member 28 and hook 16 to prevent the hook 16 from becoming tangled with the leader 14 forward of the leader.

Leader 14 in embodiments of the invention is flexible to allow the hook to swing laterally, but preferably resists twisting so that the hook 16 is oriented in a relatively fixed angular position with respect to clip 28. In this manner, the angular position of hook 16 relative to the axis of the body 12 is in a fixed position when clip 28 is coupled in recess 52 of second member 24. Generally, the length from first clip member 28 to the end of hook 16 is less than or equal to the overall length of body 12 to prevent the hook from becoming tangled in the leader forward of the body 12. Generally, the leader 14 is made from the standard gauges of nylon fishing line that are commercially available.

Figure 9:
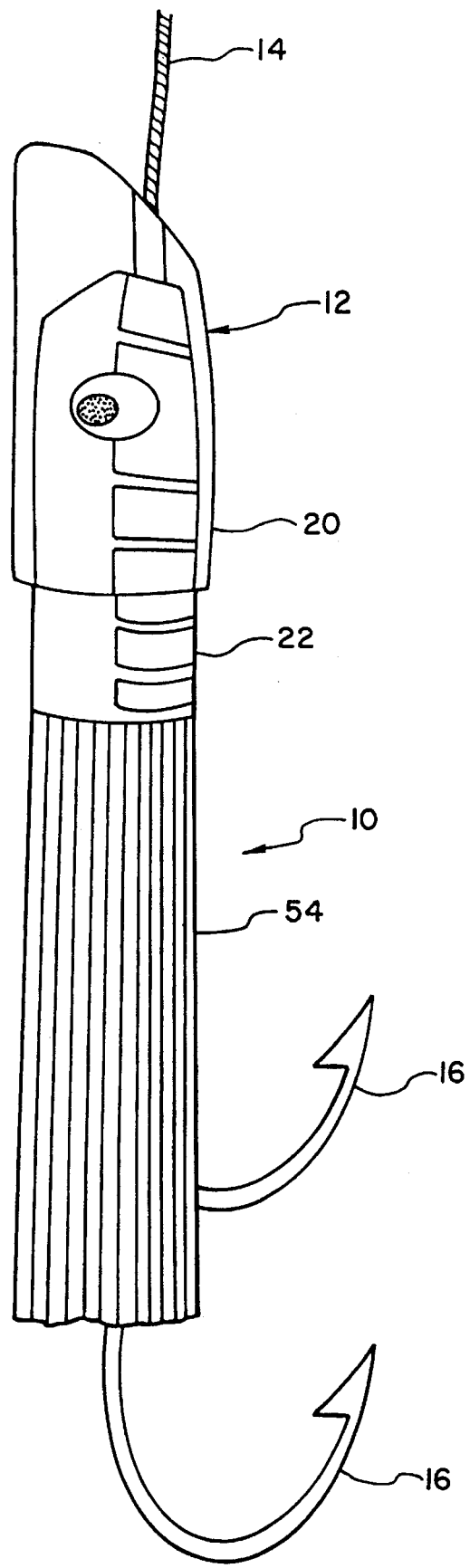
FIG. 9 is a side elevational view of the trolling jig showing the skirt portion of the jig.

In use, fishing lure 10 can have fringe 54 or other fish attracting material attached to body 12 to simulate a fly, fish or other animal as shown in FIG. 9. Leader 14 extends through the longitudinal bore of head member 20, first member 22 and second member 24. The loop 26 is formed by clip members 28 and 30 with hook 16 coupled to the loop. Clip members 28 and 30 are metal members which are crimped around leader 14 and have a substantially non-circular shape. The forward clip 28 is fitted into recess 52 to removably couple the body 12 to leader 14. As previously discussed, leader 14 between clip member 28 and hook 16 is flexible, but preferably resists twisting such that the angular position of hook 16 is determined by the orientation of recess 52. As shown in FIGS. 1 and 2, the position of second member 24 with respect to first member 22 alters the movement of the lure when pulled through the water.

The fishing lure 10, when pulled through the water, prevents the hook from becoming tangled in the leader while allowing a fish to bite and become hooked. After a fish becomes hooked, the first clip member 28 is able to release from recess 52 so that body 12 slides forward along the leader 14 to prevent the body 12 from using the body 12 to pry the hook from the fish. Sliding the body 12 forward from the hook 16 along the leader enables the user to better grasp the hook 16 while removing the hook from the fish.

While advantageous embodiments have been chosen to illustrate the embodiments of the invention, it will be readily understood by those skilled in the art that various modifications and changes can be made therein without departing from the spirit and scope of the invention.

What is claimed is:

1. A fishing device for use with a trolling jig comprising:

a leader;

a head member having a longitudinal axis with a leading end and a trailing end, said head member having an axial bore extending therethrough for receiving said leader;

a first member extending axially from said trailing end of said head member, said first member having a trailing axial face with a plurality of axially extending recesses therein, said first member including an axial bore for receiving said leader;

a second member having a plurality of prongs on a first axial face and being received in said recesses of said first member for removably coupling said second member in a selected angular position to said first member, said second member having a second axial face with a recess therein and an axial bore for receiving said leader;

at least one hook coupled to said leader proximate a trailing end of said second member, a first clip member coupled to said leader coupling said at least one hook to said leader; and being removably received in said recess in said second member;

a second clip member coupled to said leader for supporting said at least one hook;

wherein said first and second clip members are positioned on said leader, and spaced from said hook to prevent said at least one hook from tangling with said leader forward of said head member, and said first clip member frictionally engages said recess in said second member whereby said first and second members are slidable along said leader away from said at least one hook.

2. The fishing device of claim 1, wherein said first member is fixed to said head member.

3. The fishing device of claim 1, wherein said first clip member is frictionally coupled to said recess in said second member.

4. The fishing device of claim 1, wherein said first clip member is received in said recess of said second member to prevent rotation of said clip and at least one hook with respect to said head member.

5. The fishing device of claim 1, wherein said second member is removable from said first clip member and is slidable along said leader forward of said at least one hook.

6. The fishing device of claim 1, wherein said leader defines a closed loop for receiving said at least hook and said second clip member closes said loop.

7. The fishing device of claim 1, wherein said second member is removably coupled to said first member to position said second member in a plurality of positions to produce different movements of said lure in water.

8. The fishing device of claim 1, wherein said second member is removably coupled to said first member to position said second member in a plurality of different angular positions, and said recess in said second member and said first clip member are oblong to fix said at least one hook in an angular position with respect to said second member.

9. A fishing device for use with a trolling jig comprising:

an elongated body having a longitudinal axis with a leading end and a trailing end, and having an axial bore extending through said body, said trailing end including a recess therein, wherein said body comprises a first member having a trailing axial face and a plurality of recesses therein, and a second member having a leading axial face with a plurality of prongs for removably coupling with said first member in a plurality of angular positions, said recess in said trailing end of said body being formed in said second member;

a leader extending through said body and having a closed loop at said trailing end of said body;

at least one hook coupled to said loop of said leader; and a clip member on said leader for forming said loop, and being removably received in said recess for removably coupling said leader to said body and preventing rotational movement of said at least one hook with respect to said body, wherein said clip is positioned on said leader to prevent said at least one hook from becoming tangled in said leader forward of said body.

10. The fishing device of claim 9, wherein said clip member is removable from said recess and body so that said body is slidable on said leader.

11. A fishing device for use with a trolling jig comprising:

a leader;

a head member having a longitudinal axis with a leading end and a trailing end, said head member having an axial bore extending therethrough for receiving said leader;

a first member extending axially from said trailing end of said head member, said first member having a trailing axial face with a plurality of axially extending recesses therein, said first member including an axial bore for receiving said leader;

a second member having a plurality of prongs on a first axial face and being removably received in said recesses of said first member for removably and adjustably coupling said second member in a selected angular position to said first member, said second member having a second axial face with a recess therein and an axial bore for receiving said leader;

at least one hook coupled to said leader proximate a trailing end of said second member, a first clip member coupled to said leader coupling said at least one hook to said leader; and being removably received in said recess in said second member;

a second clip member coupled to said leader for supporting said at least one hook;

wherein said first and second clip members are positioned on said leader, and spaced from said at least one hook to prevent said at least one hook from tangling with said leader forward of said head member wherein said second member is removably coupled to said first member to position said second member in a plurality of positions with respect to said first member to produce different movements of said device in water and wherein said first and second members are separable from each other and slidable along said leader away from said at least one hook to prevent a fish from becoming entangled.

12. The fishing device of claim 11, wherein said recess has a substantially oblong shape.

13. The fishing device of claim 11, wherein said recess has a substantially non-circular shape and said first clip has a shape complementing said recess to resist rotational movement of said clip in said recess.

* * * * *